United States Patent
Smirnov et al.

(10) Patent No.: US 9,361,359 B1
(45) Date of Patent: Jun. 7, 2016

(54) ACCESSING SCHEMA-FREE DATABASES

(75) Inventors: Alexis Smirnov, Brossard (CA); Andre Gauthier, St-Jacques-Le-Mineur (CA); Max Windisch, Montreal (CA)

(73) Assignee: EMC Corporation, Hopkinton, MA (US)

( * ) Notice: Subject to any disclaimer, the term of this patent is extended or adjusted under 35 U.S.C. 154(b) by 840 days.

(21) Appl. No.: 12/586,719

(22) Filed: Sep. 25, 2009

(51) Int. Cl.
*G06F 17/30* (2006.01)

(52) U.S. Cl.
CPC ...... *G06F 17/3061* (2013.01); *G06F 17/30563* (2013.01)

(58) Field of Classification Search
None
See application file for complete search history.

(56) References Cited

U.S. PATENT DOCUMENTS

| 7,895,173 B1* | 2/2011 | Dedu-Constantin et al. . | 707/705 |
| 2002/0099686 A1* | 7/2002 | Schwartz et al. ................. | 707/1 |
| 2003/0097383 A1 | 5/2003 | Smirnov et al. | |
| 2004/0148612 A1* | 7/2004 | Olsen ............................ | 719/328 |
| 2006/0195476 A1* | 8/2006 | Nori et al. .................... | 707/104.1 |
| 2007/0011134 A1* | 1/2007 | Langseth et al. ................... | 707/1 |
| 2007/0233708 A1* | 10/2007 | Baio et al. ...................... | 707/100 |
| 2010/0095247 A1 | 4/2010 | Maillot et al. | |
| 2010/0235353 A1* | 9/2010 | Warnock ........... | G06F 17/30696 707/723 |
| 2010/0325276 A1* | 12/2010 | Aarni et al. .................... | 709/226 |

OTHER PUBLICATIONS

Amazon SimpleDB: Developer Guide, API Version Apr. 15, 2009, Amazon web services, 107 pp.

* cited by examiner

*Primary Examiner* — Miranda Huang
(74) *Attorney, Agent, or Firm* — Muirhead and Saturnelli, LLC (57) ABSTRACT

Accessing a schema-free database includes constructing a model indicating a structure for the data to be used by applications accessing the data, validating the model based on the structure and on the data stored in the schema-free database, providing an API based on the structure, and accessing the database using the API. The model may be constructed by extracting data structure information from a program. The program may be written in the Ruby programming language or the Python programming language. The API may be a RESTful API.

16 Claims, 7 Drawing Sheets

ACCESSING SCHEMA-FREE DATABASES

BACKGROUND OF THE INVENTION

1. Technical Field

This application relates to the field of storing data, and more particularly to the field of accessing data in a database.

2. Description of Related Art

Data storage may be categorized into two broad categories: schema-based and schema-free. Schema-based platforms offer access to data via pre-defined data structures, or data schema. The data schema is defined by the provider of the platform and is not changed by platform's client application. Such platforms generally provide web service APIs designed around the schema. In schema-free platforms, on the other hand, the data can be stored without needing to pre-define any data model. The API provided by schema-free platform is highly generic and does not make any assumptions about the data model of the data being stored or queried.

Each platform category has its benefits and drawbacks. Schema-based platforms expose an API appropriate for building applications that create and access data that follows a pre-defined schema. For example, Facebook APIs are suitable for applications that deal with people's profiles and their social network. The drawback of schema-based platforms lies in their being inappropriate to support applications that use a different data model. Thus, the range of possible applications is reduced to those that can be built around existing API.

In contrast, schema-free platforms provide developers with greater flexibility when building applications, and eliminate the need to re-factor an entire database as those applications evolve. Thus, schema-free platforms can support a greater range of applications with different data models. For example Amazon's Simple DB, a schema-free platform, offers a key-value storage API. The drawback of schema-free platforms is that they require an application to serialize its data model into a form suitable for storage via a generic interface. The query model supported by schema-free databases is separate from the application's data model. As a result, an application is responsible for managing the mapping between its internal data model and platform's API.

Accordingly, it would be desirable to provide a database mechanism that includes the benefits of schema-based and schema-free platforms without the drawbacks of those systems.

SUMMARY OF THE INVENTION

According to the system described herein, accessing a schema-free database includes constructing a model indicating a structure for the data to be used by applications accessing the data, validating the model based on the structure and on the data stored in the schema-free database, providing an API based on the structure, and accessing the database using the API. The model may be constructed by extracting data structure information from a program. The program may be written in the Ruby or Python programming languages. The API may be a RESTful API. Accessing a schema-free may also include constructing an optimization for each field of data provided in the data model. The optimization may be an index containing an entry for each indexed value and a corresponding node ID indicating a particular node of the schema-free database containing data corresponding to the value. The optimization may be an index containing an entry for each indexed value and a corresponding location of a node in a data file containing the schema-free database. Validating the model may include confirming that data fields in the model correspond to data properties provided in the schema-free database.

According further to the system described herein, computer software, provided in a computer-readable storage medium, accesses a schema-free database. The software includes executable code that validates a data model that indicates a structure for data to be used by applications to access the data in the schema-free database, executable code that provides an API based on the structure, and executable code that provides access to the database using the API. The model may be based on data structure information from a program. The program may be written in the Ruby or Python programming languages. The API may be a RESTful API. The computer software may also include executable code that constructs an optimization for each field of data provided in the data model. The optimization may be an index containing an entry for each indexed value and a corresponding node ID indicating a particular node of the schema-free database containing data corresponding to the value. The optimization may be an index containing an entry for each indexed value and a corresponding location of a node in a data file containing the schema-free database Executable code that validates the model may confirm that data fields in the model correspond to data properties provided in the schema-free database.

According further to the system described herein, accessing a schema-free database includes providing a dynamic API platform that presents the data of the schema-free database in a structured form, determining if a data request received through the API corresponds to data in the schema-free database, and accessing an index to obtain a node in the schema-free database, where the node corresponds to data accessed through the API and where the index contains an entry for the data and a corresponding entry indicating the node. The entry indicating the node may be a node ID or may be a location of the node in a data file containing the schema-free database. The API may be a RESTful API.

The system described herein provides a schema-free platform that is augmented with a capability to dynamically create an API specific to application's data model, thus presenting a pseudo schema-based interface to the application.

DETAILED DESCRIPTION OF VARIOUS EMBODIMENTS

Figure 1:
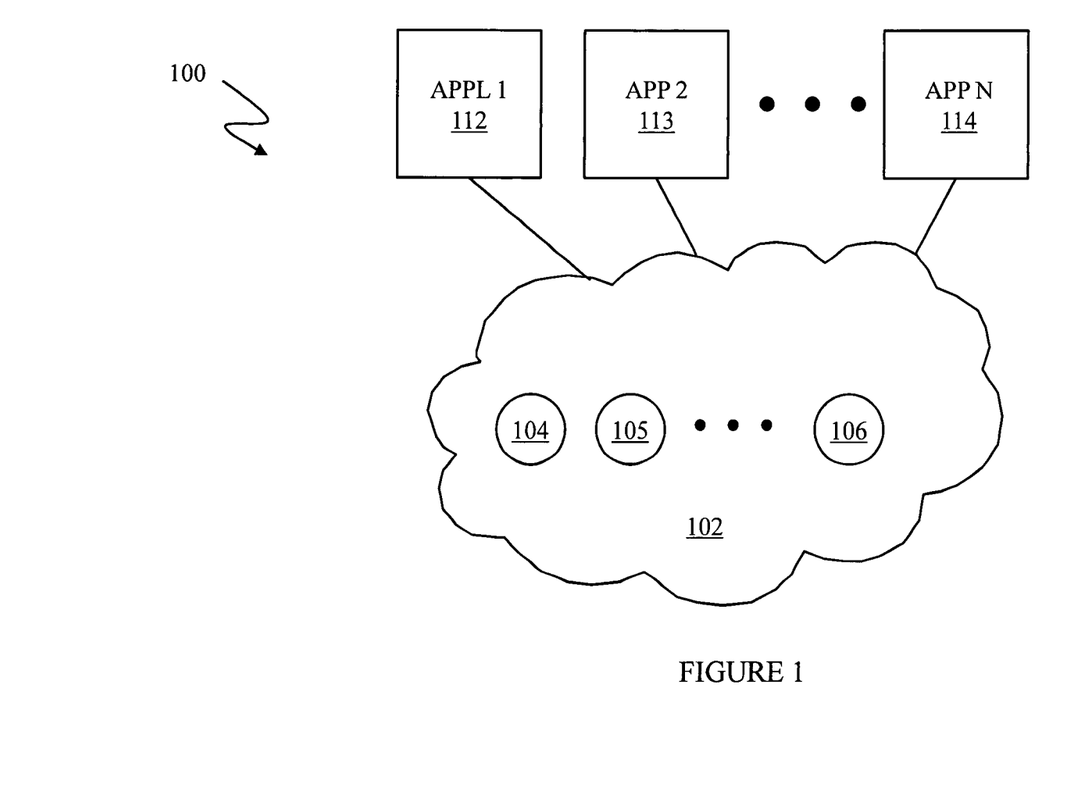
FIG. 1 is a diagram illustrating a schema-free database coupled to a plurality of applications according to an embodiment of the system described herein.

Referring to FIG. 1, a diagram 100 shows a schema-free database 102 that contains a plurality of nodes 104-106. Although only three specific ones of the nodes 104-106 are shown in FIG. 1, the nodes 104-106 represent any number of nodes since the schema-free database 102 may contain any number of nodes. A plurality of applications 112-114 access the schema-free database 102 by reading and/or writing data from/to the nodes 104-106. Just as with the nodes 104-106, although only three specific one of the applications 112-114 are shown, the applications 112-114 represent any number of applications. As explained in more detail elsewhere herein, each of the nodes 104-106 contains information indicating one or more properties and associated values therefor that may be used and/or manipulated by the applications 112-114.

In an embodiment herein, the schema-free database 102 may be stored in a single data file in non-volatile computer data storage (e.g., a disk), although other types of storage schemes may be used, including multiple data files, combinations of data files and other types of non-volatile storage, etc. Also, in an embodiment herein, each of the nodes 104-106 may be identified by a unique node ID that is different for each of the nodes. The node IDs may be numeric values, strings, symbols, or any other appropriate token-like value that may be used to uniquely identify the nodes 104-106.

Figure 2:
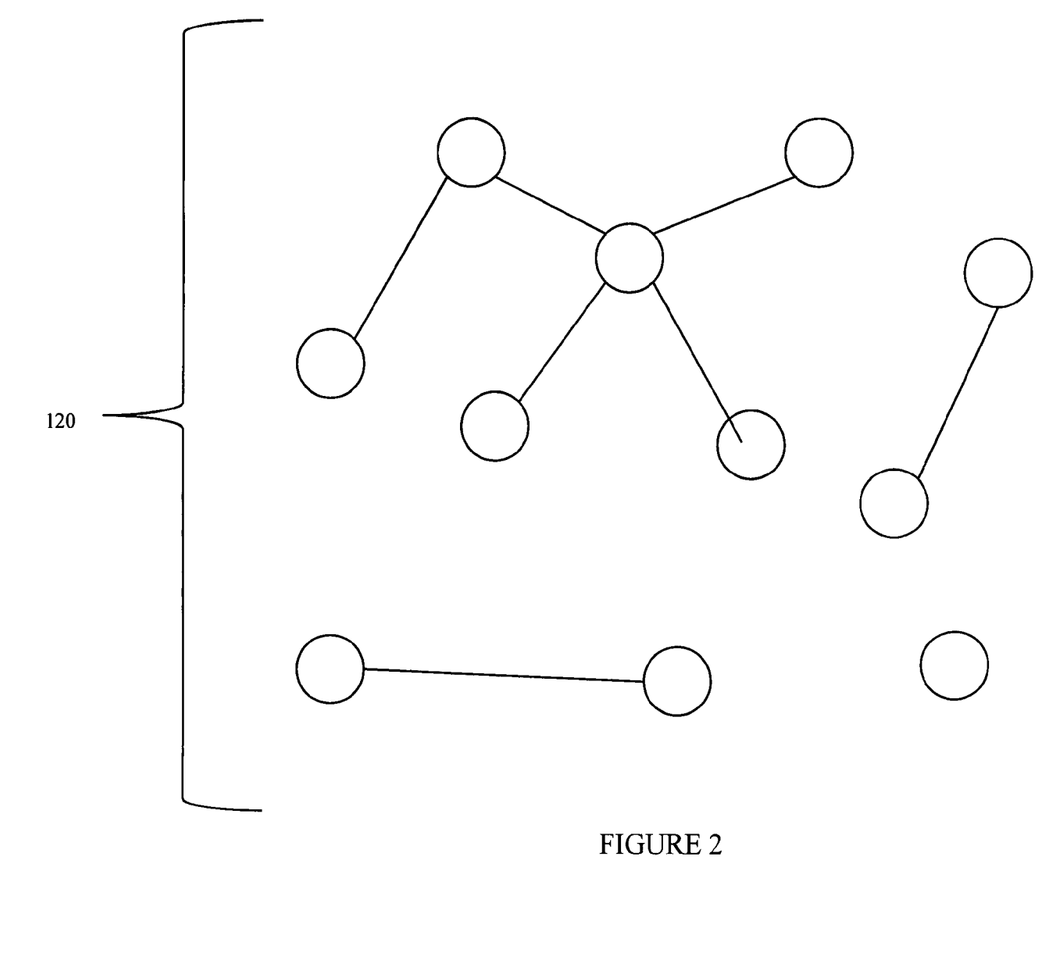
FIG. 2 is a diagram illustrating a plurality of interconnected nodes of a schema-free database according to an embodiment of the system described herein.

Referring to FIG. 2, a subset 120 of the nodes 104-106 are shown as being interconnected. Interconnections between the nodes 104-106 may be facilitated by data within each of the nodes 104-106 that provides pointers to other ones of the nodes 104-106. This is explained in more detail elsewhere herein. The interconnections may be formed and/or adjusted by one or more applications (not shown in FIG. 2) according to processing performed by the application(s). In some instances, the nodes may be interconnected/adjusted by system processes and/or processes that are not applications. In an embodiment herein, the interconnections may be used to express a relationship between the interconnected nodes. For example, a node containing an address of a particular contact in an address book may be interconnected with another node containing the phone number of the particular contact. As illustrated by the subset 120, the nodes 104-106 may be interconnected in any configuration, including having no connections, having one connection, or having multiple connections.

Figure 3:
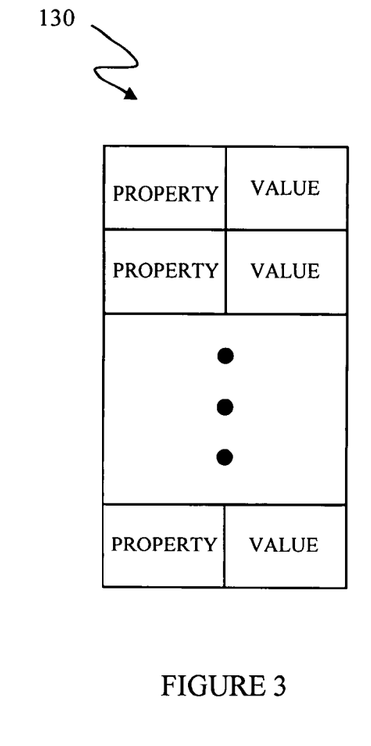
FIG. 3 is a diagram illustrating data stored in nodes of a schema-free database according to an embodiment of the system described herein.

Referring to FIG. 3, an index 130 indicates information stored in the nodes 104-106. The information includes a plurality of properties and associated values. The properties are defined/used by the applications 112-114 and thus can be any information that may be quantified and stored in a database. For example, a property could be a telephone number and the associated value for a specific telephone number may be a string indicating the phone number (e.g., "508-555-1212").

Each of the nodes 104-106 may have different property/value sets and it is possible for no two of the nodes 104-106 to have the same set. Of course, it is also possible for all of the nodes to have the same set.

In an embodiment herein, the property field of an element of the index 130 could indicate that the corresponding value points to another one of the nodes 104-106 of the schema-free database 102, thus providing interconnections for the nodes illustrated by the subset 120 of nodes shown in FIG. 2. There may be any number of such entries, including zero, one, or more than one in accordance with the subset 120 shown in FIG. 2 and discussed above.

Figure 4:
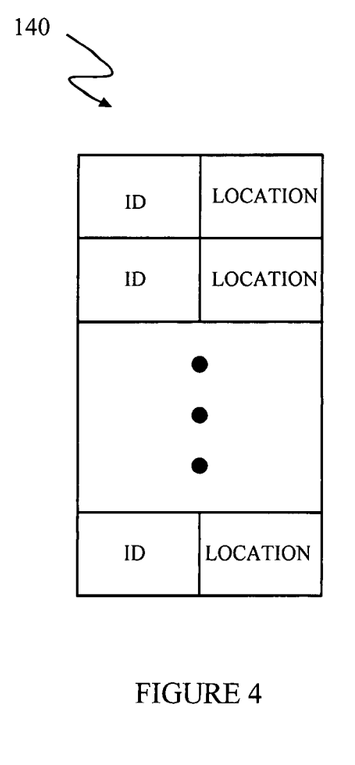
FIG. 4 is a diagram illustrating correlating node IDs and storage locations for a schema-free database according to an embodiment of the system described herein.

Referring to FIG. 4, an index 140 illustrates a plurality of node IDs and location values therefor. The index 140 may be used by an application to find the nodes in the schema-free database. Each entry in the index 140 may include a node ID and a location value that indicates a location of the corresponding node in the schema-free database 102. In an embodiment herein, the schema-free database 102 may be provided in a computer data file and the location value may indicate an offset from the beginning of the data file where the corresponding one of the nodes 104-106 is stored. Of course other storage schemes and/or location conventions may be used. For example, it is possible to have each node be stored in its own file, in which case the location field could indicate the name of the file.

In some instances, it may be useful to provide other indexes for quickly locating values stored in the nodes 104-106. The indexes would be searchable according to the values, and would provide a pointer to the one of the nodes 104-106 containing a particular searched value.

Figure 5:
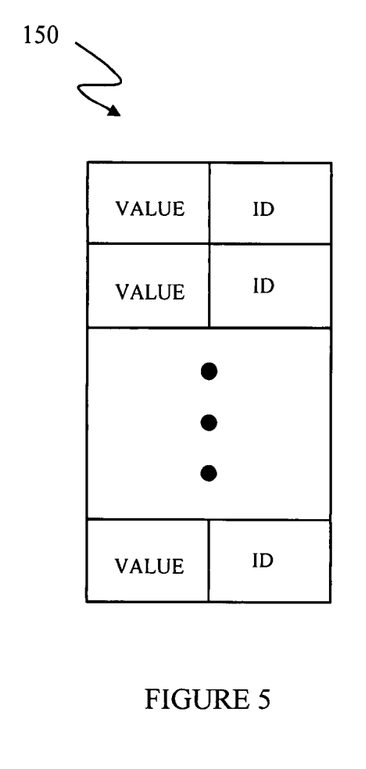
FIG. 5 is a diagram illustrating correlating data values and node IDs for a schema-free database according to an embodiment of the system described herein.

Referring to FIG. 5, an index 150 correlates particular values of data stored in the schema-free database with particular node IDs. Each of the values in the index 150 may represent a value corresponding to a particular property of the nodes 104-106. For example, if at least some of the nodes 104-106 contain a property of last name (i.e., of a contact), then each of the values in the index 150 may correspond to a different last name stored in the nodes 104-106 (e.g., "Smith", "Jones", "Williams", etc.). Each entry of the index 150 contains an ID for the one of the nodes 104-106 that contains the value provided in the entry. Thus, for example, if the index 150 is a list of name values, then each entry of the index 150 contains a specific name as well as an id for the one of the nodes 104-106 that contains that name.

An application searching for a node containing a particular name would first consult the index 150 to find an entry in which the value is the same as the name of interest. Once the entry is found (if it exists), the application would use the corresponding ID and the index 140 to locate the specific one of the nodes 104-106. The index 150 may be constructed using any appropriate technique, including traversing all of the nodes 104-106 using the index 140 to find nodes containing properties and corresponding values of interest. In some systems, an index may be created for all possible properties of the nodes 104-106 while in other systems, no indexes are created, and thus all searches must be performed by traversing all of the nodes 104-106 each time. Of course, it is possible to create indexes for some properties but not for others.

Figure 6:
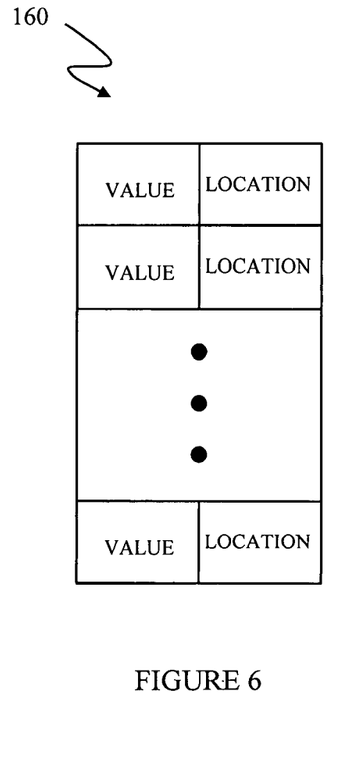
FIG. 6 is a diagram illustrating correlating data values and storage locations for a schema-free database according to an embodiment of the system described herein.

Referring to FIG. 6, an index 160 contains a plurality of entries where each entry has a value as well as a corresponding location indicating a particular one of the nodes 104-106 having the value. An application searching for a value of interest could search the index, find an entry containing the value, and use the location field of the entry to determine the node containing the value. Thus, the index 160 advantageously combines the entries of the index 140 with the entries of the index 150 to reduce the number of steps used to find a node containing a particular value. Note, however, that a disadvantage of using indexes like the index 160 shown in FIG. 6 is that, if any of the nodes 104-106 are moved within the data file (or other storage) used for the schema-free database 102 (e.g., in connection with garbage collection, compaction, etc.), then it is necessary to update all of the indexes. In contrast, if node IDs are used like that shown in the index 150, then when nodes are moved, it is only necessary to update the index 140 that correlates node IDs with the location of the nodes 104-106 within the data file.

Note that it is possible for the indexes to use some other mechanism for optimizing searches for values in the schema-free database 102. In addition, other types of search optimizations may be provided for searching for values in the schema-free database 102. Accordingly, the system described herein is not limited by any specific type of search optimization technique or system.

The system described herein allows a user to construct a data model for access by an application. For example, if the schema-free database 102 contains names, addresses, and phone numbers used for contacts, a user may desire to retrieve data for each contact as a single unit, to search the names and return a phone number, etc. Of course, all of this is possible to do within the application so long as appropriate software is provided to access the schema-free database 102. However, it may be desirable to present a pseudo schema-based interface to the application to facilitate arranging the data in a logical fashion. In addition, a number of different applications may want to be presented with different schemas in order to access the same data in different ways. The system described herein provides a flexible mechanism for creating different schema interfaces to access the schema-free database 102.

Figure 7:
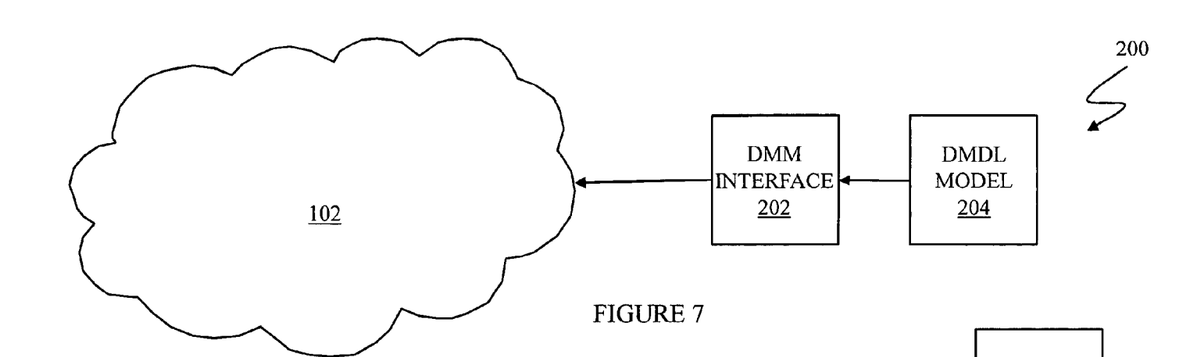
FIG. 7 is a diagram illustrating presenting a DMDL model to a schema-free database according to an embodiment of the system described herein.

Referring to FIG. 7, a diagram 200 includes the schema-free database 102, a Data Model Manipulation (DMM) interface 202, and a Data Model Descriptor Language (DMDL) model 204. The DMM interface 202 represents any appropriate combination of computer hardware and/or software for providing the functionality described in more detail herein. The DMM interface 202 may share at least some hardware/software with the hardware/software that is used to implement the schema-free database 102.

The DMDL model 204 represents a desired structure for the data of the schema-free database 102 that will subsequently be used by one or more applications to access the data. The DMDL model 204 may be in any suitable format and an application developer may create the DMDL model 204 using any suitable means. In an embodiment herein, a developer may develop application code using the Ruby or Python programming language so that the DMDL model 204 may be created using the Introspection operation to extract the data structures from the Ruby or Python code. Of course, other programming languages may be used and the DMDL model 204 may be created manually and/or may be created independently of the programming language that is used. Whatever format/technique is used, the DMDL 204 must describe the data and relationships thereof to be used by the application(s).

As an example, suppose the nodes 104-106 of the schema-free database 102 contain data regarding names, addresses, phone numbers, and email addresses for a number of different people. As discussed elsewhere herein, the data in the schema-free database is not necessarily arranged in any sort of structure or order. However, using the system described herein, a developer can specify a data structure called a contact that includes the name, address, phone number, etc. The system then provides an Application Program Interface (API) that subsequent applications can use to access the data in the schema-free database according to the new structure that has been specified.

Figure 8:
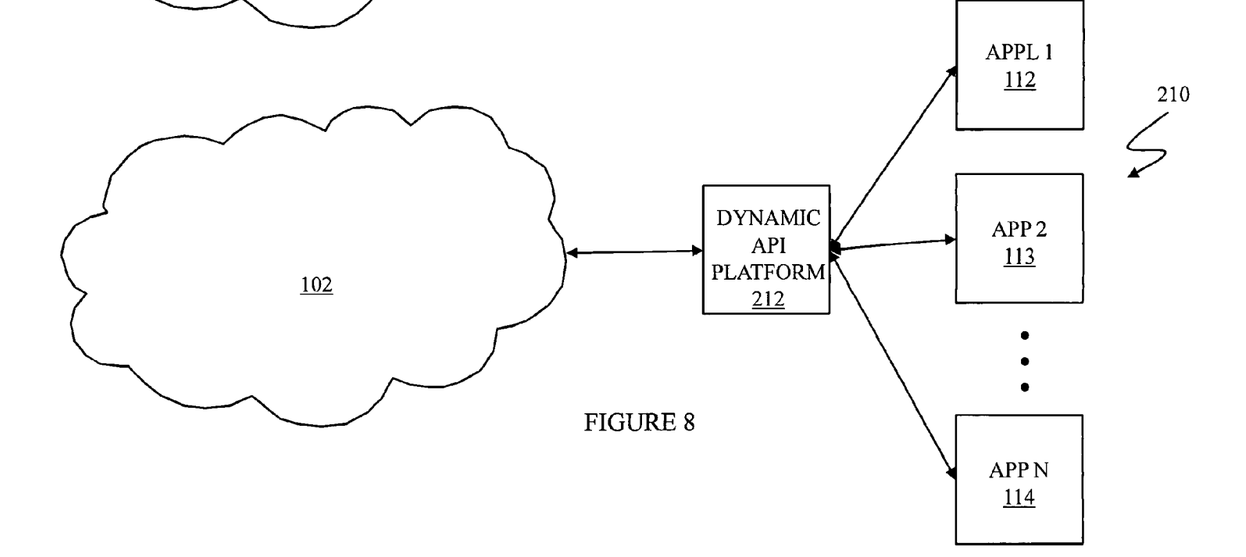
FIG. 8 is a diagram illustrating applications using a dynamic API platform to access a schema-free database according to an embodiment of the system described herein.

Referring to FIG. 8, a diagram 210 includes the schema-free database 102, a dynamic API platform 212, and the applications 112-114. The dynamic API platform 212 represents any appropriate combination of computer hardware and/or software for providing the functionality described herein. The dynamic DPI platform 212 may share at least some hardware/software with the hardware/software that is used to implement the schema-free database 102. As described in more detail elsewhere herein, the dynamic API platform presents the applications 112-114 with an API constructed according to the DMDL model 204. The applications 112-114 use the API to access data in the schema-free database 102. The API allows an application to manipulate data of the schema-free database 102 as if the data were part of a schema-based platform, depending on how the developer has constructed the API.

Figure 9:
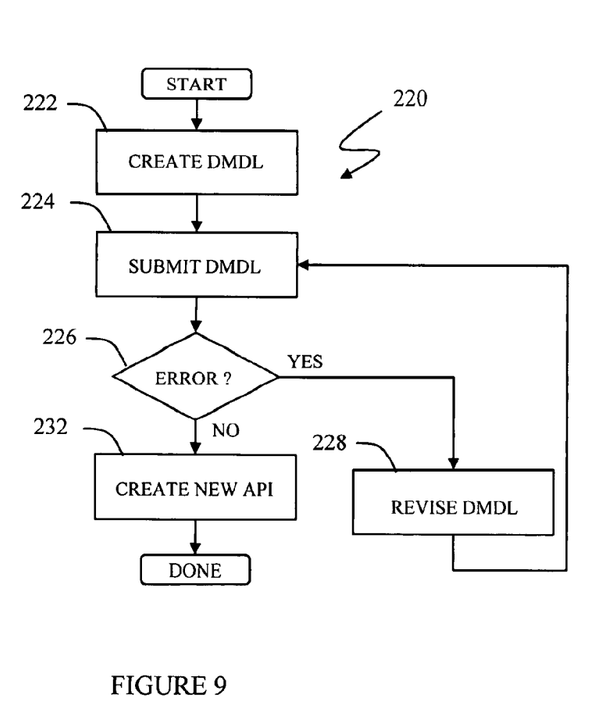
FIG. 9 is a flow chart illustrating developing a DMDL model for accessing a schema-free database according to an embodiment of the system described herein.

Referring to FIG. 9, a flow chart 220 illustrates steps performed in connection with developing a new API according to the system described herein. Processing begins at a first step 222 where a developer creates a DMDL model. As discussed elsewhere herein, the DMDL model may be created using any suitable means. Following the step 222 is a step 224 where the developer submits the DMDL model to the DMM interface 202 for validation. In an embodiment herein, the DMDL model is submitted using an HTTP Post with the DMDL model in the body of the request.

Following the step 224 is a test step 226 where the DMM interface 202 determines if there are any errors in the DMDL model. At the step 225, the DMM interface 202 may check the DMDL model for syntax as well as confirming that all of the requested fields are part of the data of the schema-free database 102. For example, it may be an error if a developer specifies an email field for a contact, but no email data exists in the schema-free database 102. If it is determined at the step 226 that the DMDL model contains an error, then control passes from the step 226 to a step 228 where the developer revises the DMDL model (to correct the error). Following the step 228, control passes back to the step 224 to resubmit the model.

If it is determined at the step 226 that no error has occurred, then control passes from the step 226 to a step 232 where the new API is created. In an embodiment herein, the API is a RESTful API (i.e., conforms to the representational state transfer style for distributed hypermedia systems). Methods such as GET, POST, and PUT are supported. Of course, in other embodiments, other types of APIs that support other operations may be used. Following the step 232, processing is complete.

Figure 10:
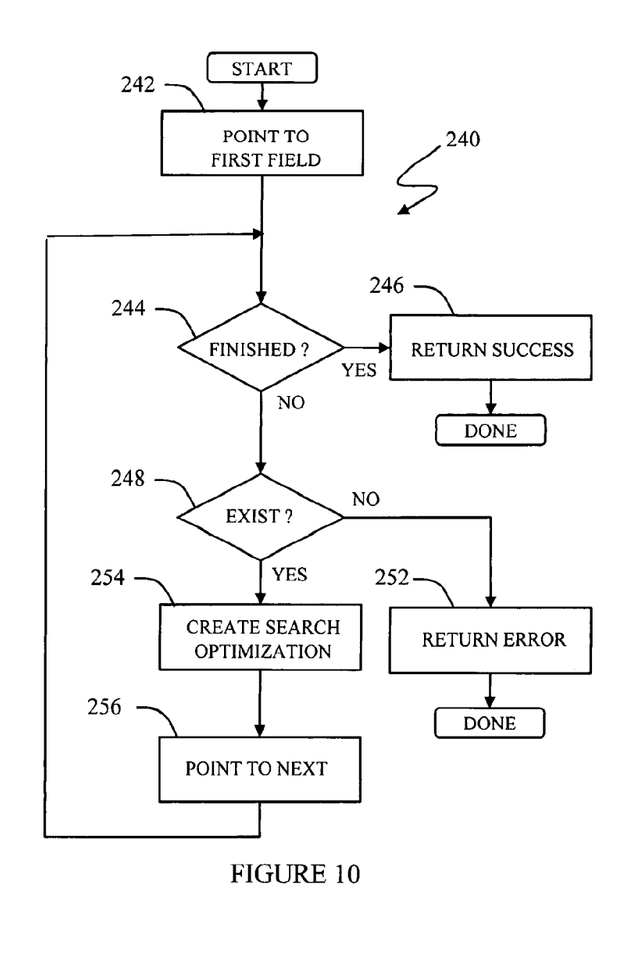
FIG. 10 is a flow chart illustrating presenting a DMDL model to a schema-free database according an embodiment of the system described herein.

Referring to FIG. 10, a flow chart 240 illustrates in more detail steps performed in connection with creating the new API at the step 232, discussed above. Processing begins at a first step 242 where a pointer, used to iterate through all of the requested data fields, is set to point to the first field. Following the step 242 is a test step 244 where it is determined if the process is finished (i.e., all of the data fields have been processed). If so, then control transfers from the test step 244 to a step 246 where a success indicator is returned to a calling process (e.g., a process called by an application developer creating the new API). Following the step 246, processing is complete.

If it is determined at the step 244 that the process for creating the API is not finished, then control transfers from the step 244 to a test step 248 where it is determined if the data field pointed to by the iteration pointer corresponds to a data property that exists in the schema-free database 102. If not, then control transfers from the step 248 to a step 252 where an error is returned to the calling process. Following the step 252, processing is complete. If it determined at the test step 248 that the particular data property does exist, then control transfers from the test step 248 to a step 254 where a search optimization is created for the data property. Creating an optimization at the step 254 may include creating an index. Indexes are discussed in more detail elsewhere herein. Following the step 254 is a step 256 where the pointer that iterates through all of the requested data fields is incremented. Following the step 256, control transfers back to the step 244 for another iteration.

Figure 11:
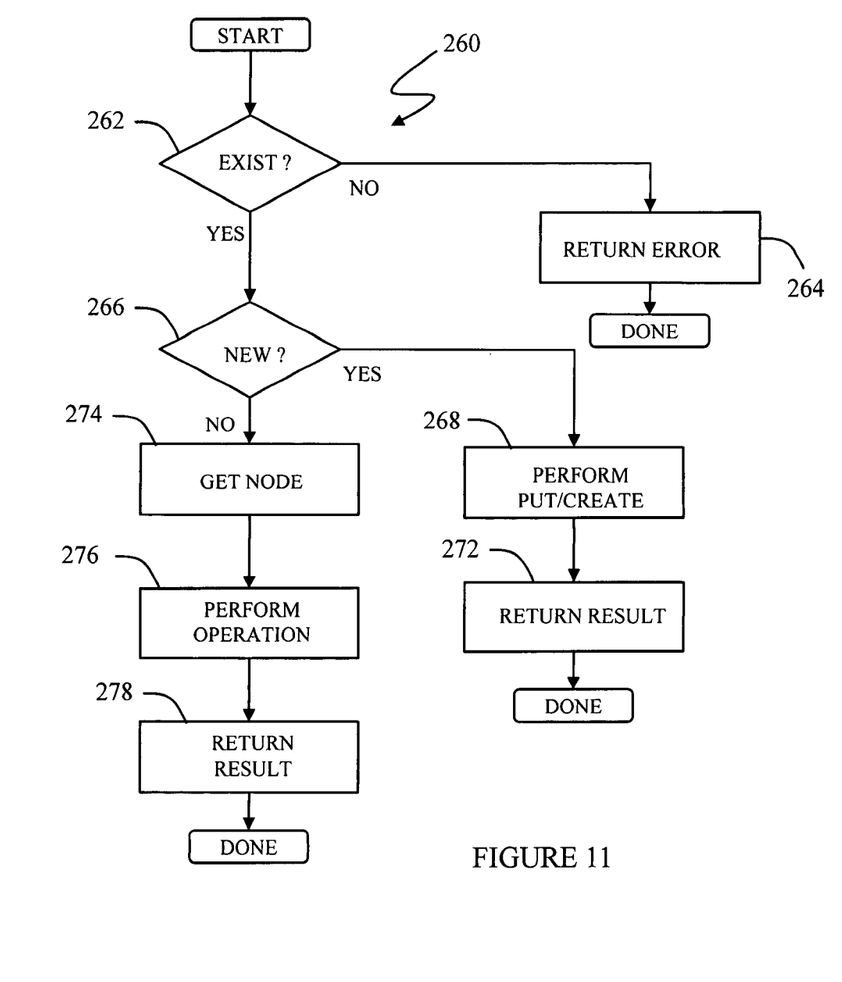
FIG. 11 is a flow chart illustrating an application using a dynamic API interface to access a schema-free database according to an embodiment of the system described herein.

Referring to FIG. 11, a flow chart 260 illustrates in detail operation of the dynamic API platform 212 in connection with the applications 112-114 using the newly-created API. Processing begins at a first test step 262 where it is determined if the data field being accessed exists. If not, then control transfers from the test step 262 to a step 264 where error processing is performed. The error processing at the step 264 could be any appropriate error processing, including providing an error message to a user. Following the step 264, processing is complete.

If it is determined at the test step 262 that the data field does exist, then control transfers from the test step 262 to a test step 266 where it is determined if new data is being added (e.g., a user is writing a new record). If so, then control transfers from the step 266 to a step 268 where a PUT/CREATE method is performed to add the new data. Following the step 268 is a step 272 where the result of the operation performed at the step 268 is returned to the application using the API. Following the step 272, processing is complete.

If it is determined at the test step 266 that new data is not being added, the control transfers from the test step 266 to a step 274 where one of the nodes 104-106 of the schema-free database 102 corresponding to the data is obtained. The node may be obtained at the step 274 using one of the previously-created optimizations (e.g., an index). Following the step 274 is a step 276 where the operation requested by the application is performed. The operation performed at the step 276 may be any appropriate data operation, such as a modify operation. Following the step 276 is a step 278 where the result of the operation performed at the step 276 is returned to the application using the API. Following the step 278, processing is complete.

In some instances, the order of steps in the flow charts may be modified, where appropriate. The system described herein may be implemented using a computer program product/software provided in a fixed computer-readable storage medium.

While the invention has been disclosed in connection with various embodiments, modifications thereon will be readily apparent to those skilled in the art. Accordingly, the spirit and scope of the invention is set forth in the following claims.

What is claimed is:

1. A method of accessing a schema-free database, comprising:
constructing a model indicating a desired data structure for data stored in the schema-free database to be used by an application accessing the data, wherein the model is constructed using a desired data structure extracted from a program of the application independently of the data or data relationships stored in the schema-free database, wherein the desired data structure includes a plurality of data fields and the schema-free database includes data with data properties;
validating the model to provide a validated model based on the desired structure and data stored in the schema-free database by determining whether the schema-free database contains data that satisfies the desired data structure and confirming that data fields in the desired data structure corresponds to data properties provided in the schema-free database;
generating an application program interface (API) for the application using the validated model in response to determining that the schema-free database satisfies the desired structure; and
accessing the schema-free database using the API, wherein the API enables access by the application to the data stored in the schema-free database according to the desired structure by presenting data from the schema-free database to the application using the API in a form according to the desired structure, enabling the application to access and manipulate data of the schema-free database based on an index, wherein the index contains entries for each indexed data and corresponding entry indicating a node in the schema-free database, and presenting a schema-based interface to the application to facilitate arranging the data stored in the schema-free database without the data being stored in any schema-based platform.

2. The method, according to claim 1, wherein the program is written in one of: the Ruby programming language and the Python programming language.

3. The method, according to claim 1, wherein the API is a RESTful API.

4. The method, according to claim 1, further comprising:
constructing an optimization for each field of data provided in the data model.

5. The method, according to claim 4, wherein the optimization is an index containing an entry for each indexed value and a corresponding node ID indicating a particular node of the schema-free database containing data corresponding to the value.

6. The method, according to claim 4, wherein the optimization is an index containing an entry for each indexed value and a corresponding location of a node in a data file containing the schema-free database.

7. A non-transitory computer-readable medium including computer software that accesses a schema-free database, the software comprising:
executable code that constructs a model indicating a desired data structure for data stored in the schema-free database to be used by an application accessing the data, wherein the model is constructed using a desired data structure extracted from a program of the application independently of the data or data relationships stored in the schema-free database, wherein the desired data structure includes a plurality of data fields and the schema-free database includes data with data properties;
executable code that validates the model to provide a validated model based on the desired structure and data stored in the schema-free database by determining whether the schema-free database contains data that satisfies the desired data structure and confirming that data fields in the desired data structure corresponds to data properties provided in the schema-free database;
executable code that generates an application program interface (API) for the application using the validated model in response to determining that the schema-free database contains data with data properties that satisfies the desired structure; and executable code that, when an API is generated, provides access to the schema-free database using the API, wherein the API enables access by the application to the data stored in the schema-free database according to the desired structure by presenting data from the schema-free database to the application using the API in a form according to the desired structure, enabling the application to access and manipulate data of the schema-free database based on an index, wherein the index contains entries for each indexed data and corresponding entry indicating a node in the schema-free database, and presenting a schema-based interface to the application to facilitate arranging the data stored in the schema-free database without the data being stored in any schema-based platform.

8. The non-transitory computer readable medium, according to claim 7, wherein the program is written in one of the Ruby programming language and the Python programming language.

9. The non-transitory computer readable medium, according to claim 7, wherein the API is a RESTful API.

10. The non-transitory computer readable medium, according to claim 7, wherein the software further comprises: executable code that constructs an optimization for each field of data provided in the data model.

11. The non-transitory computer readable medium, according to claim 10, wherein the optimization is an index containing an entry for each indexed value and a corresponding node ID indicating a particular, node of the schema-free database containing data corresponding to the value.

12. The non-transitory computer readable medium, according to claim 10, wherein the optimization is an index containing an entry for each indexed value and a corresponding location of a node in a data file containing the schema-free database.

13. A method of accessing a schema-free database, comprising:
constructing a model indicating a desired data structure for data stored in the schema-free database to be used by an application accessing the data, wherein the model is constructed using a desired data structure extracted from a program of the application, independently of the data or data relationships stored in the schema-free database, wherein the desired data structure includes a plurality of data fields and the schema-free database includes data with data properties;
validating the model to provide a validated model based on the desired structure and data stored in the schema-free database by determining whether the schema-free database contains data that satisfies the desired data structure and confirming that data fields in the desired data structure corresponds to data properties provided in the schema-free database;
generating a dynamic application program interface (API) platform for the application using the validated model in response to determining that the schema-free database contains data with data properties that satisfies the desired structure; and
accessing an index to obtain a node in the schema-free database that corresponds to data accessed through the API by presenting data from the schema-free database to the application using the API in a form according to the desired structure, enabling the application to access and manipulate data of the schema-free database based on an index, wherein the index contains entries for each indexed data and corresponding entry indicating a node in the schema-free database, and presenting a schema-based interface to the application to facilitate arranging the data stored in the schema-free database without the data being stored in any schema-based platform, wherein the index contains an entry for the data and a corresponding entry indicating the node.

14. The method, according to claim 13, wherein the entry indicating the node is a node ID.

15. The method, according to claim 13, wherein the entry indicating the node is a location of the node in a data file containing the schema-free database.

16. The method, according to claim 13, wherein the API is a RESTful API.

* * * * *